United States Patent [19]

Ortner et al.

[11] Patent Number: 5,062,964
[45] Date of Patent: Nov. 5, 1991

[54] PROCESS FOR CONTROL OF A FLOTATION SYSTEM

[75] Inventors: Herbert Ortner; Lothar Pfalzer, both of Heidenheim, Fed. Rep. of Germany

[73] Assignee: J. M. Voith GmbH, Heidenheim, Fed. Rep. of Germany

[21] Appl. No.: 505,762

[22] Filed: Apr. 6, 1990

[30] Foreign Application Priority Data

Apr. 7, 1989 [DE] Fed. Rep. of Germany ....... 3911233

[51] Int. Cl.⁵ ........................... B03D 1/02; C02F 1/24
[52] U.S. Cl. ..................................... 210/740; 210/709; 210/704; 210/103; 209/1; 209/164; 209/166
[58] Field of Search ............... 210/703, 709, 739, 740, 210/744, 96.1, 704, 86, 103, 104, 105; 209/1, 164, 166

[56] References Cited

U.S. PATENT DOCUMENTS

| | | | |
|---|---|---|---|
| 4,133,746 | 1/1979 | Dopson | 209/164 |
| 4,902,429 | 2/1990 | Carpenter et al. | 210/744 |

FOREIGN PATENT DOCUMENTS

| | | | |
|---|---|---|---|
| 258184 | 4/1970 | U.S.S.R. | 209/166 |
| 484011 | 12/1975 | U.S.S.R. | 209/166 |
| 513723 | 7/1976 | U.S.S.R. | 209/166 |
| 518232 | 8/1976 | U.S.S.R. | 209/164 |
| 1033145 | 8/1983 | U.S.S.R. | 209/166 |
| 1036381 | 8/1983 | U.S.S.R. | 209/166 |
| 1063465 | 12/1983 | U.S.S.R. | 209/164 |

Primary Examiner—Stanley S. Silverman
Assistant Examiner—Neil M. McCarthy
Attorney, Agent, or Firm—Jeffers, Hoffman & Niewyk

[57] ABSTRACT

In a flotation system, the generated quantity of foam is determined and, independent thereof, process parameters which directly or indirectly affect the generated foam quantity are reduced in their quantity depending on foam quantity. This is brought about by reduction of specific substance flows and also such substance flows that circulate in a flotation system. Production waters used for dilution are partly replaced by fresh water. This precludes an excessive amount of generated foam from causing difficulties in the operation of a flotation system.

4 Claims, 2 Drawing Sheets

PROCESS FOR CONTROL OF A FLOTATION SYSTEM

BACKGROUND OF THE INVENTION

In flotation systems, the fraction to be separated occurs as foam, which in many systems is removed by way of a foam chute. If excess foam is generated, the result can be operational failures due to the difficulties in removing the precipitated or to-be-precipitated foam, or through an overflow of the excess quantity of foam out of the foam chute.

From the German utility patent 87 01 636 it is known to control the amount of air in an injector by means of throttle valves. Associated with this control of the amount of air, naturally, is also the control of the generated foam quantity of the flotation system. However, priority goes here to the type of generated air bubbles, so that here the adaptation of the air is essentially required only to the throughput amount of suspension to be subjected to flotation so as to produce an optimal flotation suspension air mixture. Thus, a specific control of the foam quantity is not possible here.

The flotation device according to the German patent application 29 04 619 employs a circular flotation flow, and the foam is sucked away at the end of this flow by a collection funnel. It is hardly conceivable that large suspension quantities can be managed with this device.

The German patent application 36 35 713 provides for a foam destroyer in connection with the foam chute, where the air is removed from the foam by an eddy flow, which aims to cause the foam to collapse. The disadvantage seems to be that only the energy of the liquid flow must bring about the foam destruction effect. Due to the heavy mixing of the liquid with air, there are certain limits to the effectiveness of this device.

The problem underlying the invention is to propose a process for the control of a flotation system in order to preclude operational failures due to the difficulties in removing the foam quantity.

SUMMARY OF THE INVENTION

This problem is inventionally solved through the features of the present invention. The generation of foam in a flotation cell or flotation system is controlled by a process wherein a control or regulation of the suspension or process parameters which essentially determines the foam quantity is effected before or after the flotation system. The control or regulation of the parameters is contingent on determining the foam level in a foam chute, or the relative air content of the generated foam or precipitated foam (sludge) by use of an appropriate probe.

Applicable process parameters that are to be controlled are preferably the returned secondary flotation substance quantity, the chemicals to be added, which may affect the foam generation, as well as the control of substance quantities that contain chemicals which favor the generation of foam.

Naturally, it is possible as well to act on the feeding of the suspension quantity, for one, and on the feeding of the air quantity directly for the flotation.

DETAILED DESCRIPTION OF THE PREFERRED EMBODIMENT

Figure 1:
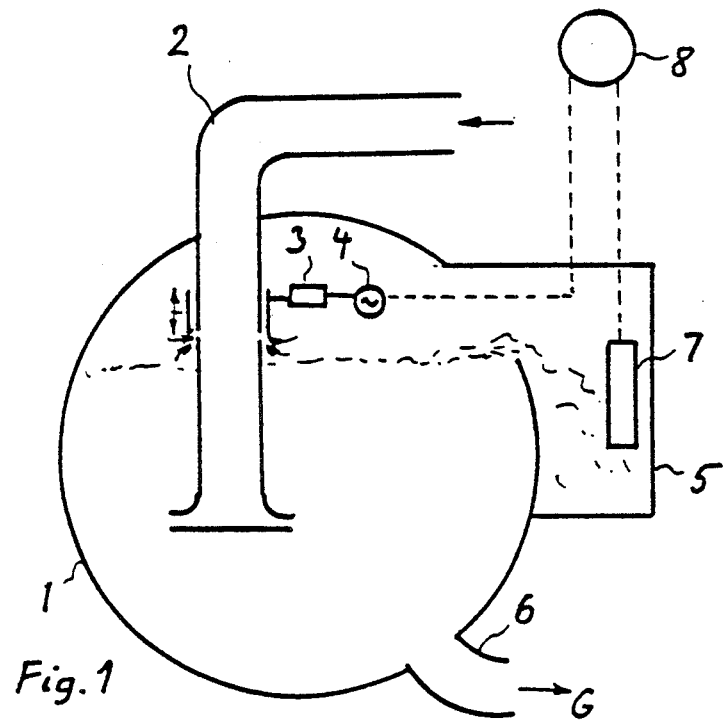
FIG. 1 shows in cross section a flotation cell according to the present invention.

FIG. 1, in cross section, illustrates a flotation cell wherein individual cells have been established in a long cylindrical container by partitioning walls. The cells receive the suspension (for instance paper fiber suspension) which is to be subjected to flotation through the feed tube 2, in which air is introduced by means of a metering channel 3 via an adjustable valve 4. An injector causes the generation of fine air bubbles and their mixing with the suspension, either by intake and/or atomization. The removal of the purified suspension takes place through the line 6, and the foam chute in which the generated foam collects is marked 5. This foam chute extends alongside the long cylinder across several flotation cells, which generally are arranged successively, as shown in FIG. 2.

A measuring probe 7 is provided which either measures the level of the foam or the amount of foam that is generated, for instance by way of the relative air share in the generated foam or the sludge forming from it, which permits a conclusion of the overall quantity of foam. The signal of this probe is transmitted to a controller or a regulating apparatus 8 which by way of the valve 4 controls the amount of air. However, such a control is not necessarily desirable, since for the amount of air certain values need to be maintained in the ratio of the supplied suspension quantity, in order to have a good flotation effect.

Figure 2:
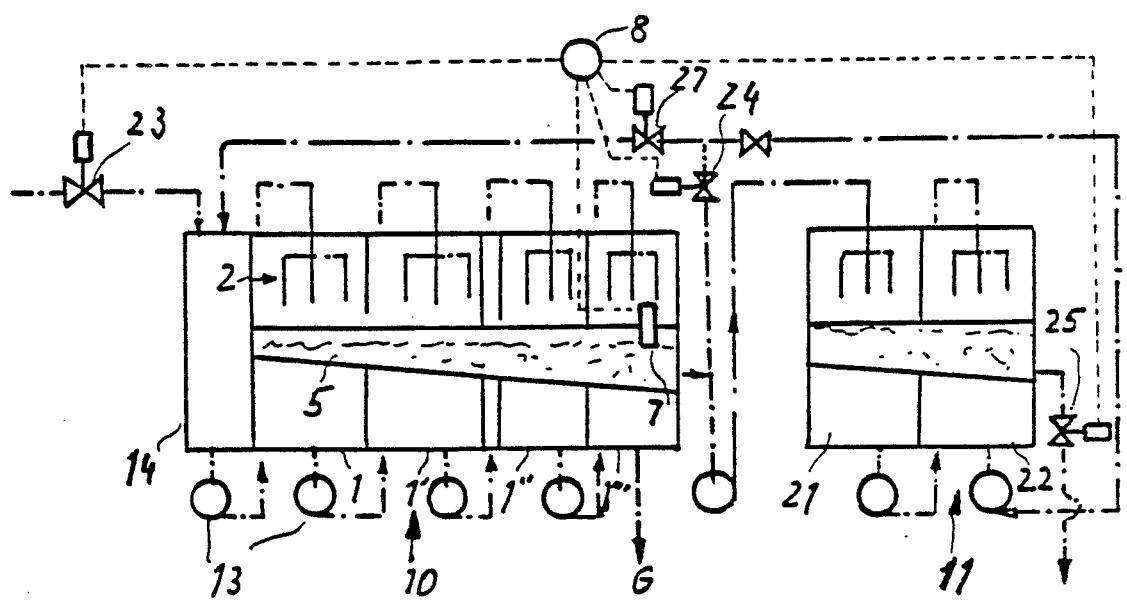
FIG. 2 shows a flotation system according to the present invention that includes a secondary flotation system.

FIG. 2 also illustrates the control of the flotation system. As shown in FIG. 2, the various cells 1, 1', 1", etc. receive the suspension quantity through pumps 13. They are preceded by a mixing cell 14, to which the suspension quantity is fed in controlled fashion by way of the valve 23. The flotation cells 1, 1'; etc. form the primary flotation 10. The accepts are removed according to arrow G. The secondary flotation system is marked 11 and comprises the two secondary cells 21 and 22, which have a design similar to the primary cells 1, 1', etc. In the case of the secondary flotation, naturally, an increased foam quantity can be controlled by increased foam removal with an increased splash water quantity for precipitation of the foam, through the valve 25.

In the primary flotation 10, the purified suspension quantity of the secondary flotation returned to the primary flotation can be reduced through valve 27, while by way of valve 23 the suspension quantity introduced in the primary flotation can be reduced at increased foam accrual.

The former measure is very advantageous because it involves only a relatively minor intervention in the overall system.

Figure 3:
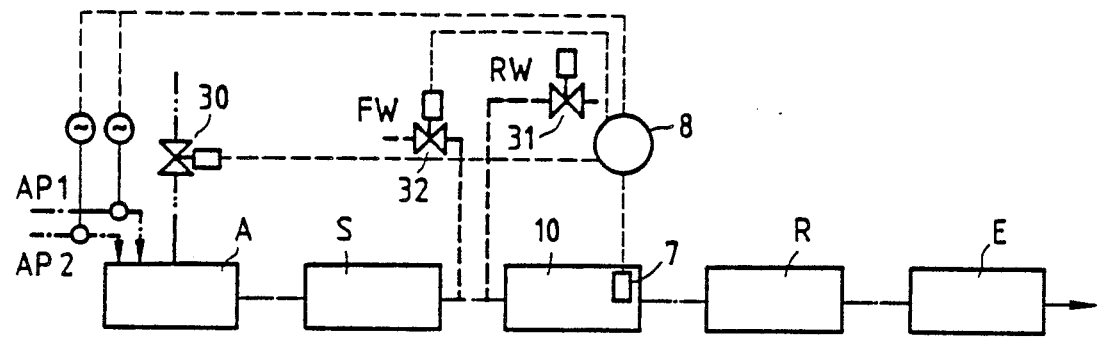
FIG. 3 shows the parameters of the deinking process acted upon by purifying or sorting stages R and S and deckering E.

According to FIG. 3, the parameters of the deinking process are acted upon as a whole by purifying or sorting stages R and S and deckering E.

For one, this can take place, with regard to the added chemicals, in the dissolution process, for instance in pulper A through valve 30, additionally by limitation of the return water (flotation water) RW removed from the fabrication process, through valve 31 and correspondingly adding instead, prorated, for instance a fresh water quantity.

A very favorable solution is the following: two different flows $AP_1$ and $AP_2$ of paper fiber suspension are used; this then makes it possible, for instance by controlling the velocity or total operating time of the conveyor belts feeding these various wastepaper qualities to the pulper, to reduce in the event of an excessive foam quantity the amount, for instance, of heavily coated paper which predominantly contains chemicals that favor the foam creation or the foam stabilization. This is indicated as well by the broken line originating from the controller 8.

Naturally, the invention is applicable also to flotation cells without foam chute, since with a probe measuring the relative air content it is possible to also examine in other flotation cells the precipitated foam (sludge) for its air content, in order to determine the quantity of foam generated. This way it is possible to also determine to what extent starting parameters have changed, for instance with regard to chemical load, or also with regard to the type of wastepaper.

Moreover, it has been inventionally recognized that a probe operating by the compression principle and measuring the relative air content provides at least a relative measure for the generated foam quantity, since on the basis of experience values it is possible to infer from the relative air content, for instance of the sludge precipitated from the flotation foam, the overall quantity of foam generated. Such a probe being very accurate in measuring, the said control measures can be initiated in due time.

Figure 4:
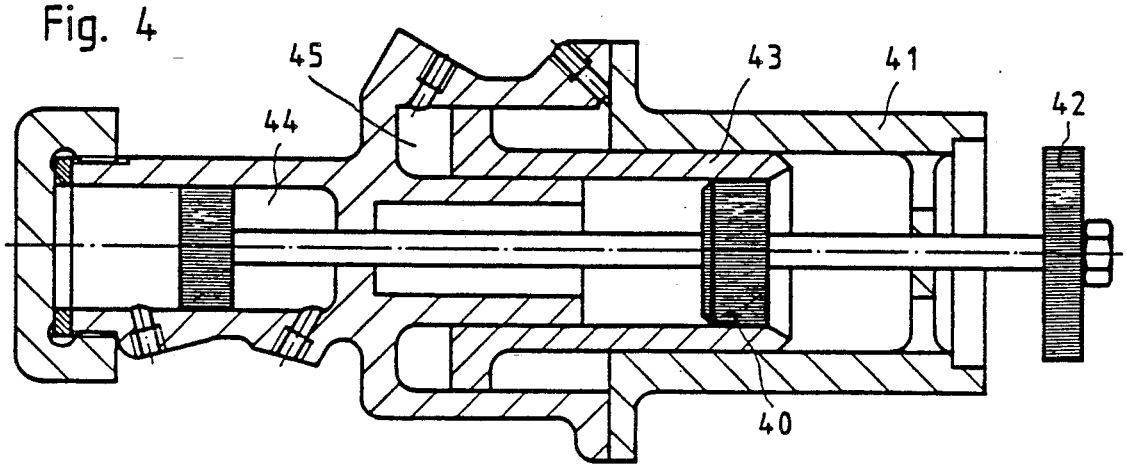
FIG. 4 shows an apparatus for measuring the relative air content of precipitated foam by measuring the degree of compression of the foam in a cylinder.

In doing so, a main piston 40 (refer to FIG. 4) sucks a sludge sample into a cylinder 41 in which the sludge then, after sealing the cylinder by means of a cap 42 connected with the main piston 40, is compressed by another, smaller piston 43. The travel of the smaller piston is then a measure for the relative air content of the sludge. The pistons are operated by a pneumatic cylinder 44 or 45.

A prior probe operating by the principle of compressing a withdrawn sludge sample and measuring the relative air content is made by Papec company, 18310 Sumner, Wash. 98390, or Clark & Vicario.

It will be appreciated that the foregoing is presented by way of illustration only, and not by way of any limitation, and that various alternatives and modifications may be made to the illustrated embodiment without departing from the spirit and scope of the invention.

What is claimed is:

1. A process for controlling the quantity of foam generated in a flotation system in which said quantity is essentially determined by process parameters acting upon said system, said process comprising:

providing a probe for measuring the relative air content of sludge precipitated from said generated foam in the flotation system, said probe being operable to transmit a signal containing said relative air content;

withdrawing a sludge sample from said flotation system;

utilizing said probe to compress the withdrawn sludge sample, and to measure the relative air content of said sludge sample by determining the degree of compression of said sample;

providing a regulating apparatus, situated before or after said flotation system, for receiving the signal transmitted from said probe; and controlling the action of at least one of said process parameters on said flotation system in response to said signal, whereby the quantity of foam generated may be regulated.

2. The process of claim 1, in which said process parameters acting upon said system include at least one of chemicals that favor the generation or stabilization of foam, flotation waters containing chemicals that favor the generation or stabilization of foam, or wastepaper suspension flows, and wherein the amount of said process parameters may be reduced in order to reduce the quantity of foam generated or stabilized in said flotation system.

3. A process for controlling the quantity of foam generated in a flotation system in which said foam is generated by process parameters acting upon said system, said process parameters including at least one of chemicals that favor the generation or stabilization of foam, flotation waters containing chemicals that favor the generation or stabilization of foam, or wastepaper suspension flows, said process comprising:

providing a probe for measuring the relative air content of sludge precipitated from said generated foam in the flotation system, said probe being operable to transmit a signal containing said relative air content;

withdrawing a sludge sample from said flotation system;

compressing said withdrawn sludge sample in said probe;

measuring the relative air content of the compressed sludge sample by determining the degree of compression of said sample;

providing a regulating apparatus, situated before or after said flotation system, for receiving the signal transmitted from said probe; and controlling the action of said process parameters on said flotation system in response to said signal, whereby the quantity of foam generated may be regulated.

4. A process for controlling the quantity of foam generated in a flotation system, said flotation system including a pulper wherein said pulper is adapted to receive two separate flows of a suspension, said flows having different contents of waste substances affecting the generation or stabilization of foam, said flows being fed to said pulper under separate controls, comprising:

providing a probe for measuring the relative air content of sludge precipitated from said generated foam in the flotation system, said probe being operable to transmit a signal containing said relative air content;

withdrawing a sludge sample from said flotation system;

utilizing said probe to compress said withdrawn sludge sample, and to measure the relative air content of said sludge sample by determining the degree of compression of said sample;

providing a regulating apparatus, situated before or after said flotation system, for receiving the signal transmitted from said probe; and controlling at least one of the flows of suspension into said pulper in response to said signal, whereby the quantity of foam generated may be regulated.

* * * * *